United States Patent
Markley et al.

(10) Patent No.: US 7,168,201 B2
(45) Date of Patent: *Jan. 30, 2007

(54) CONNECTOR ASSEMBLY FOR A FISHING POLE

(75) Inventors: Duane C. Markley, Spokane Valley, WA (US); Ron Stokes, Spokane Valley, WA (US)

(73) Assignee: Eagle Mountain Brokers, Inc., Spokane Valley, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/130,298

(22) Filed: May 16, 2005

(65) Prior Publication Data

US 2005/0268524 A1    Dec. 8, 2005

Related U.S. Application Data

(63) Continuation of application No. 10/655,792, filed on Sep. 4, 2003, now Pat. No. 6,922,936.

(51) Int. Cl.
*A01K 87/02* (2006.01)
*F16B 7/20* (2006.01)
*F16D 1/10* (2006.01)
*A01K 87/00* (2006.01)

(52) U.S. Cl. ............................. 43/18.1 CT; 43/18.1 R; 403/349

(58) Field of Classification Search .......... 43/18.1 CT, 43/18.1 R, 23; 403/349, 348, 361, 109.3, 403/109.4, 200; 285/318, 321
See application file for complete search history.

(56) References Cited

U.S. PATENT DOCUMENTS

| | | | | |
|---|---|---|---|---|
| 28,694 A | * | 6/1860 | Smith | .......................... 403/349 |
| 230,650 A | * | 8/1880 | Niswander | ............. 43/18.1 CT |
| 303,474 A | * | 8/1884 | Webb | ....................... 43/18.1 R |
| 305,140 A | * | 9/1884 | Bradley | ....................... 403/348 |
| 389,335 A | * | 9/1888 | Spear | ....................... 43/18.1 R |
| 481,462 A | * | 8/1892 | Benson | ..................... 43/18.1 R |
| 799,810 A | * | 9/1905 | Tredwell | .................. 43/18.1 R |
| 993,121 A | * | 5/1911 | Stone et al. | ............. 43/18.1 R |
| 998,318 A | * | 7/1911 | Young | ..................... 43/18.1 R |
| 999,318 A | | 7/1911 | Young | ..................... 43/18.1 R |

(Continued)

FOREIGN PATENT DOCUMENTS

CH         281052        6/1952       ............ 43/18.1 CT (Continued)

*Primary Examiner*—Darren W. Ark
(74) *Attorney, Agent, or Firm*—Wells St. John P.S.

(57) ABSTRACT

A connector assembly for a fishing pole is provided with a first connecting member, a second connecting member, and a spring. The first connecting member has a locking stud. The second connecting member has an L-shaped slot therein for axial receipt of the stud and rotated locking engagement with the stud. The spring is interposed between the first connecting member and the second connecting member. The spring is configured to axially urge apart the first connecting member and the second connecting member when provided in rotated locking engagement therebetween. One of the first connecting member and the second connecting member includes a tapering surface. Another of the first connecting member and the second connecting member includes a mating contact surface configured to mate in engagement with the tapering surface to tighten engagement between the first connecting member and the second connecting member as the first connecting member and the second connecting member are urged apart by the spring.

16 Claims, 11 Drawing Sheets

U.S. PATENT DOCUMENTS

| | | | | |
|---|---|---|---|---|
| 1,033,187 | A * | 7/1912 | Metzger | 403/349 |
| 1,351,473 | A * | 8/1920 | Forster | 43/18.1 R |
| 1,450,700 | A | 4/1923 | Mull | 43/18.1 CT |
| 1,512,509 | A * | 10/1924 | Thorpe | 43/18.1 CT |
| 1,820,644 | A * | 8/1931 | Bach | 285/318 |
| 1,909,529 | A | 5/1933 | Gephart | 43/23 |
| 1,920,966 | A | 8/1933 | Carlson | 43/23 |
| 1,932,099 | A * | 10/1933 | Cabana | 403/349 |
| 1,962,869 | A | 6/1934 | Heddon | 43/18.1 R |
| 2,005,081 | A | 6/1935 | Gephart | 43/18.1 CT |
| 2,157,153 | A | 5/1939 | Troche | 403/349 |
| 2,276,524 | A * | 3/1942 | Taylor | 43/18.1 R |
| 2,307,386 | A * | 1/1943 | Braxton | 403/349 |
| 2,418,418 | A * | 4/1947 | Martin et al. | 403/343 |
| 2,483,519 | A | 10/1949 | Bishoff | 43/22 |
| 2,516,195 | A | 7/1950 | Finton | 403/349 |
| 2,527,256 | A | 10/1950 | Jackson | 403/349 |
| 2,538,306 | A * | 1/1951 | Fox et al. | 43/18.1 R |
| 2,541,759 | A | 2/1951 | Hamre | 43/18.1 CT |
| 2,559,934 | A | 7/1951 | Briney | 43/18.1 R |
| 2,600,259 | A | 6/1952 | Palmer | 43/23 |
| 2,601,351 | A * | 6/1952 | Wilburn | 43/18.1 CT |
| 2,606,050 | A | 8/1952 | Morris et al. | 403/349 |
| 2,610,427 | A | 9/1952 | Caroland | 43/18.1 R |
| 2,750,184 | A | 6/1956 | Warndahl | 43/23 |
| 2,759,288 | A * | 8/1956 | Renedict | 13/18.1 R |
| 2,793,458 | A | 5/1957 | Stephens | 43/23 |
| 2,793,902 | A | 5/1957 | Govan, Jr. | 403/349 |
| 2,816,389 | A * | 12/1957 | Sens | 43/18.1 R |
| 2,820,655 | A * | 1/1958 | Hileman | 403/349 |
| 3,034,798 | A | 5/1962 | Portz | 43/18.1 R |
| 3,079,188 | A * | 2/1963 | Oswold | 285/321 |
| 3,170,721 | A * | 2/1965 | Wells et al. | 43/18.1 CT |
| 3,181,264 | A | 5/1965 | De Simone | 43/23 |
| 3,216,144 | A | 11/1965 | Vojinov | 43/18.1 R |
| 3,229,406 | A * | 1/1966 | Binkley | 43/18.1 R |
| 3,287,031 | A * | 11/1966 | Simmons et al. | 403/349 |
| 3,296,732 | A | 1/1967 | Magnus | 43/23 |
| 3,423,781 | A | 1/1969 | Henson | 403/349 |
| 3,426,466 | A | 2/1969 | Shepherd | 43/23 |
| 3,507,069 | A * | 4/1970 | Borba, Sr. | 43/18.1 R |
| 3,570,164 | A * | 3/1971 | Tozier | 43/18.1 R |
| 3,614,143 | A | 10/1971 | Stevens | 43/18.1 CT |
| 3,773,360 | A * | 11/1973 | Timbers | 285/321 |
| 3,811,215 | A * | 5/1974 | Fleischer | 43/18.1 CT |
| 3,820,801 | A | 6/1974 | Lindler | 43/23 |
| 3,869,218 | A * | 3/1975 | Stoeber et al. | 403/349 |
| 3,876,320 | A | 4/1975 | Phillipson | 43/23 |
| 3,927,486 | A | 12/1975 | Yuen | 43/23 |
| 3,933,011 | A * | 1/1976 | DiGilio et al. | 403/349 |
| 4,027,419 | A * | 6/1977 | Popeil | 43/18.1 CT |
| 4,067,133 | A * | 1/1978 | Livingston | 43/18.1 CT |
| 4,130,960 | A * | 12/1978 | Fontenot | 43/18.1 R |
| 4,158,983 | A * | 6/1979 | Amico | 403/349 |
| 4,313,626 | A | 2/1982 | Duncan | 285/86 |
| 4,518,162 | A | 5/1985 | Oates | 403/349 |
| 4,541,197 | A * | 9/1985 | LeRoue | 43/18.1 R |
| 4,693,029 | A | 9/1987 | Yamamoto et al. | 43/23 |
| 4,756,638 | A * | 7/1988 | Neyret | 403/349 |
| 4,796,373 | A | 1/1989 | Struntz | 43/23 |
| 4,836,127 | A * | 6/1989 | Wille | 403/349 |
| 4,850,130 | A | 7/1989 | Childre et al. | 43/23 |
| 4,905,398 | A * | 3/1990 | Botbyl | 43/18.1 R |
| 4,943,182 | A | 7/1990 | Hoblingre | 403/349 |
| 4,986,690 | A * | 1/1991 | Cooksey | 403/348 |
| 4,995,188 | A * | 2/1991 | Ewing | 43/23 |
| 5,094,464 | A * | 3/1992 | Musacchia, Sr. | 403/349 |
| 5,261,758 | A * | 11/1993 | Vranish | 403/348 |
| 5,433,552 | A * | 7/1995 | Thyu | 403/109.3 |
| 5,444,934 | A * | 8/1995 | LaTouche | 43/18.1 CT |
| 5,456,095 | A * | 10/1995 | Tawil et al. | 403/349 |
| 5,496,323 | A * | 3/1996 | Dye | 403/348 |
| 5,513,622 | A * | 5/1996 | Musacchia, Sr. | 403/349 |
| 5,537,773 | A | 7/1996 | Matsubara et al. | 43/23 |
| 5,864,980 | A * | 2/1999 | Lai | 43/18.1 CT |
| 5,924,235 | A * | 7/1999 | McCulley et al. | 43/18.1 CT |
| 5,974,722 | A | 11/1999 | Kiser | 43/18.1 CT |
| 6,000,164 | A * | 12/1999 | Maeda | 43/18.1 R |
| 6,021,597 | A | 2/2000 | Lajoie | 43/25 |
| 6,115,955 | A | 9/2000 | Sledge | 43/18.1 HR |
| 6,126,359 | A * | 10/2000 | Dittrich et al. | 403/349 |
| 6,151,826 | A | 11/2000 | Grice | 43/22 |
| 6,494,636 | B1 * | 12/2002 | Mozena | 403/349 |
| 6,574,924 | B2 * | 6/2003 | Maniezzo | 403/349 |
| 6,619,876 | B2 * | 9/2003 | Vaitkus et al. | 403/349 |
| 6,685,236 | B2 * | 2/2004 | Setterberg, Jr. | 285/318 |
| 6,869,243 | B1 * | 3/2005 | Teeter | 403/109.3 |
| 6,908,121 | B2 * | 6/2005 | Hirth et al. | 285/318 |
| 6,922,936 | B2 * | 8/2005 | Markley et al. | 43/18.1 CT |
| 2002/0189149 | A1 * | 12/2002 | Borgeat | 43/18.1 R |
| 2003/0231927 | A1 * | 12/2003 | Hale | 403/349 |
| 2005/0034350 | A1 * | 2/2005 | Foster | 43/18.1 CT |

FOREIGN PATENT DOCUMENTS

| | | | |
|---|---|---|---|
| DE | 19707373 C1 * | 2/1998 | |
| EP | 634601 A1 * | 1/1995 | |
| FR | 631144 | 12/1927 | 43/18.1 CT |
| FR | 1064979 | 5/1954 | 43/23 |
| FR | 1067718 | 6/1954 | 43/18.1 CT |
| FR | 2431828 | 3/1980 | |
| FR | 2570928 | 4/1986 | |
| FR | 2602287 A * | 2/1988 | |
| FR | 2662755 A1 * | 12/1991 | |
| FR | 2763656 A1 * | 11/1998 | |
| GB | 882 B1 | 0/1889 | 43/18.1 CT |
| GB | 6102 B1 | 0/1898 | 43/18.1 CT |
| GB | 7832 B1 | 0/1897 | 43/18.1 CT |
| GB | 9421 | 0/1895 | 43/18.1 CT |
| GB | 12281 B1 | 0/1893 | 43/18.1 CT |
| GB | 14405 B1 | 0/1895 | 43/18.1 CT |
| GB | 17927 | 0/1888 | 43/18.1 CT |
| GB | 19689 B1 | 0/1893 | 43/18.1 CT |
| GB | 71775 B1 | 0/1897 | 43/18.1 CT |
| GB | 71775 A * | 7/1897 | 43/18.1 CT |
| GB | 128893 | 7/1919 | 43/23 |
| GB | 577615 | 5/1946 | 43/23 |
| JP | 52-11417 A * | 7/1975 | |
| JP | 10-14449 | 3/1989 | |
| JP | 11-75634 | 7/1989 | |
| JP | 2-17221 A * | 1/1990 | |
| JP | 200161380 | 6/1990 | |
| JP | 5236849 | 9/1993 | |
| JP | 6292487 | 10/1994 | |
| JP | 10 262506 | 10/1998 | |
| JP | 10276627 | 10/1998 | |
| JP | 11318280 | 11/1999 | |
| JP | 200050769 | 2/2000 | |
| JP | 2000125709 | 5/2000 | |
| JP | 2003-166511 A * | 6/2003 | |
| JP | 2004-125364 A * | 4/2004 | |
| JP | 2005-6638 A * | 1/2005 | |
| WO | WO-92/20540 A * | 11/1992 | |

* cited by examiner

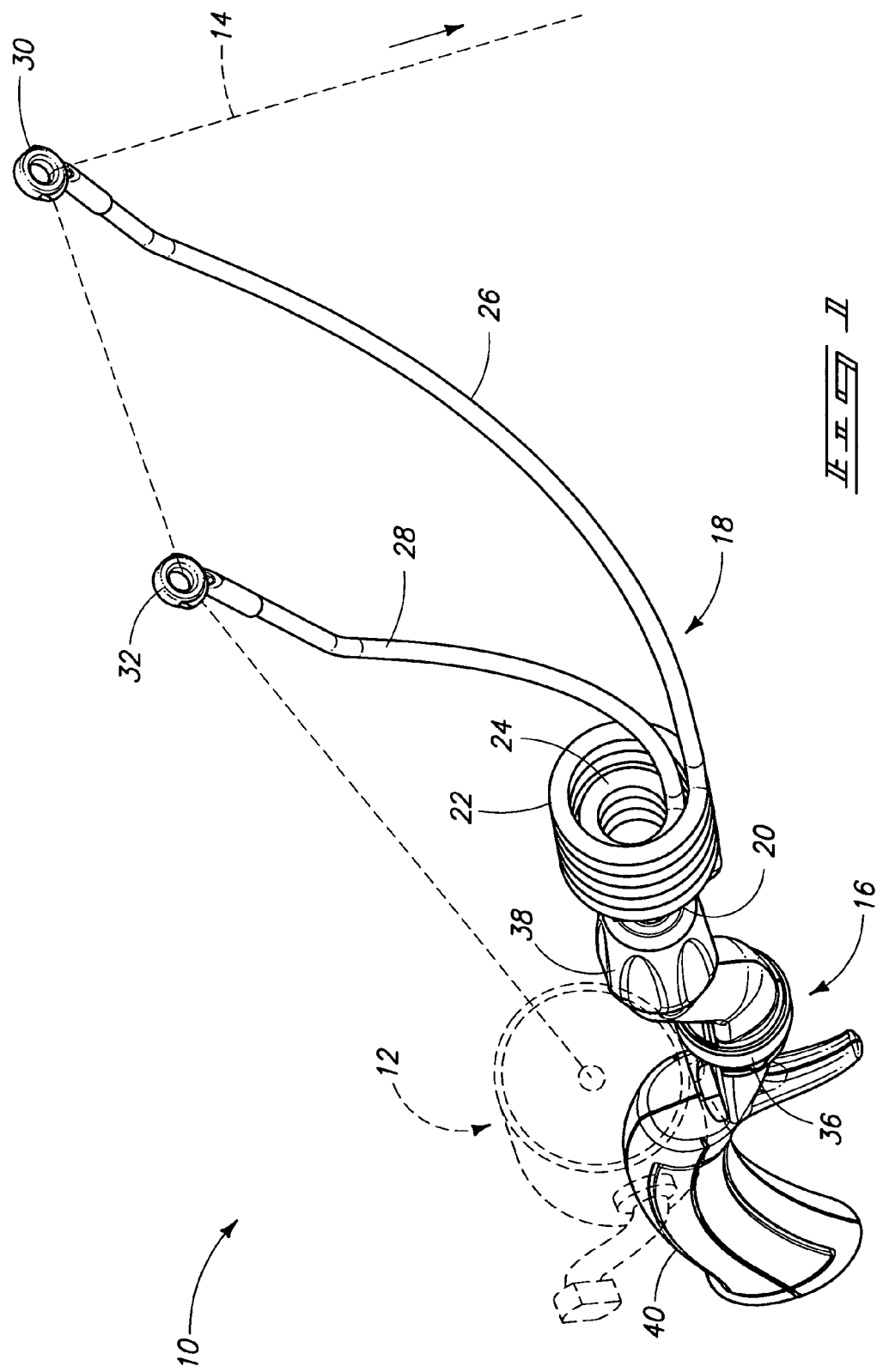

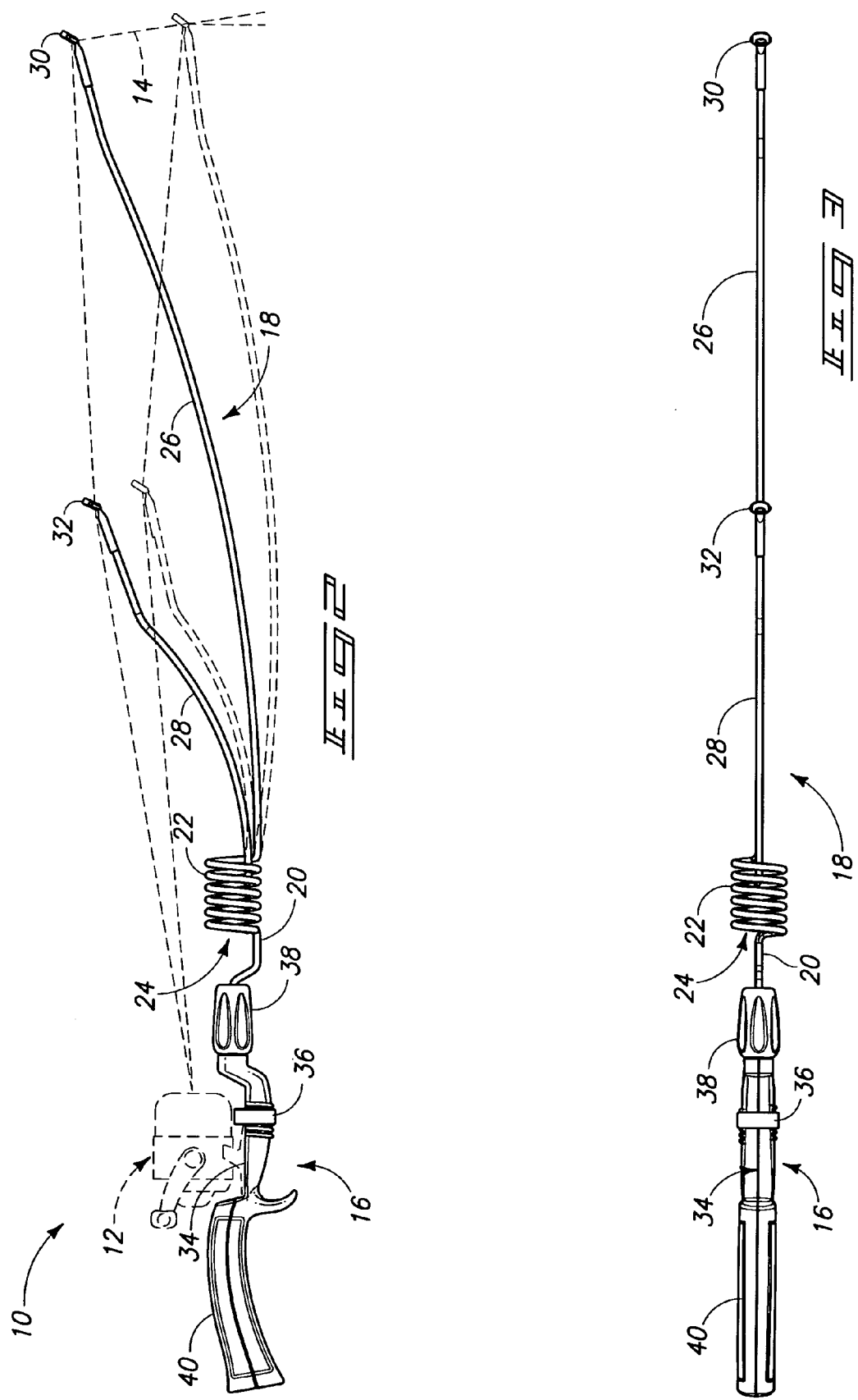

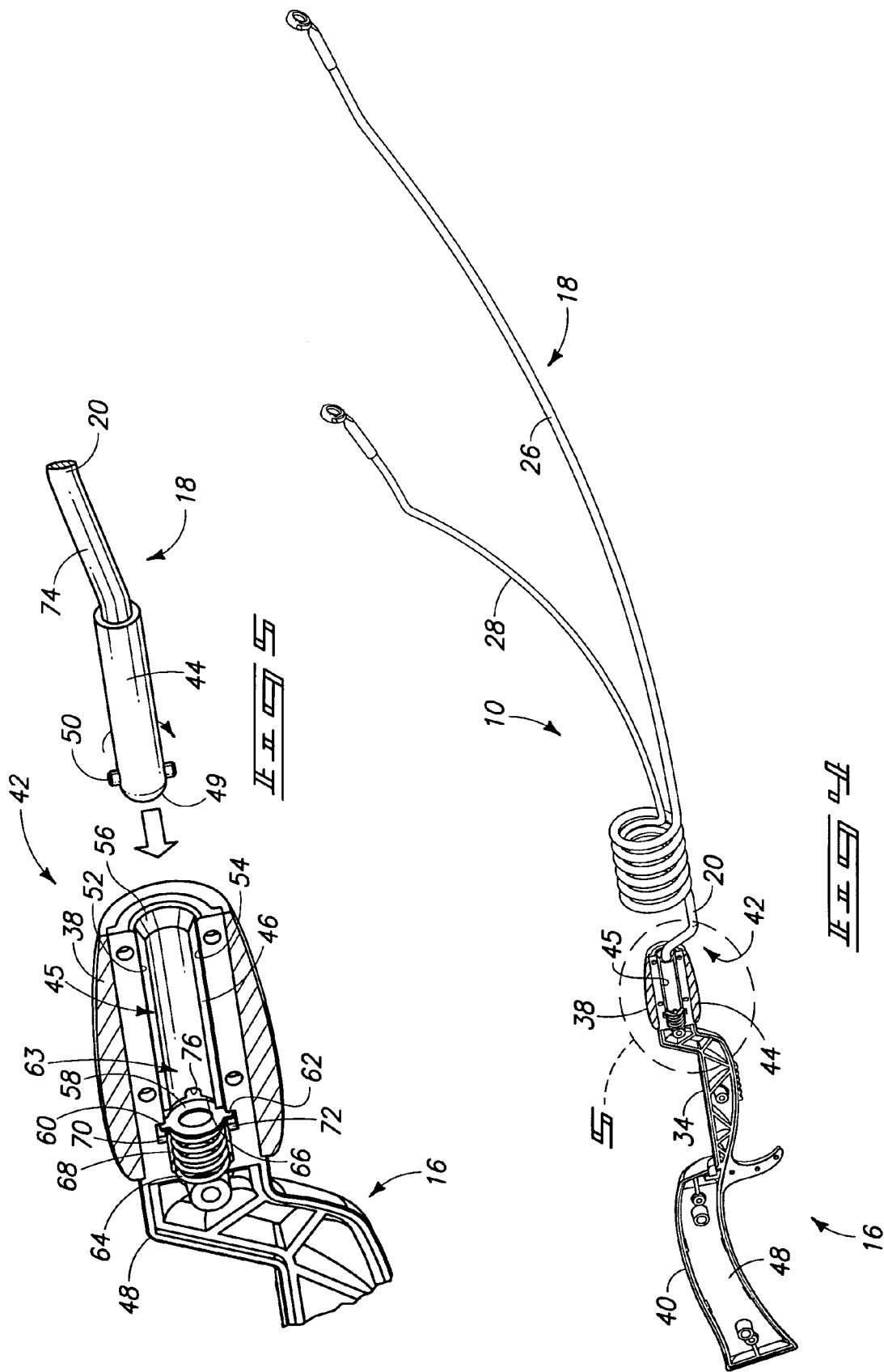

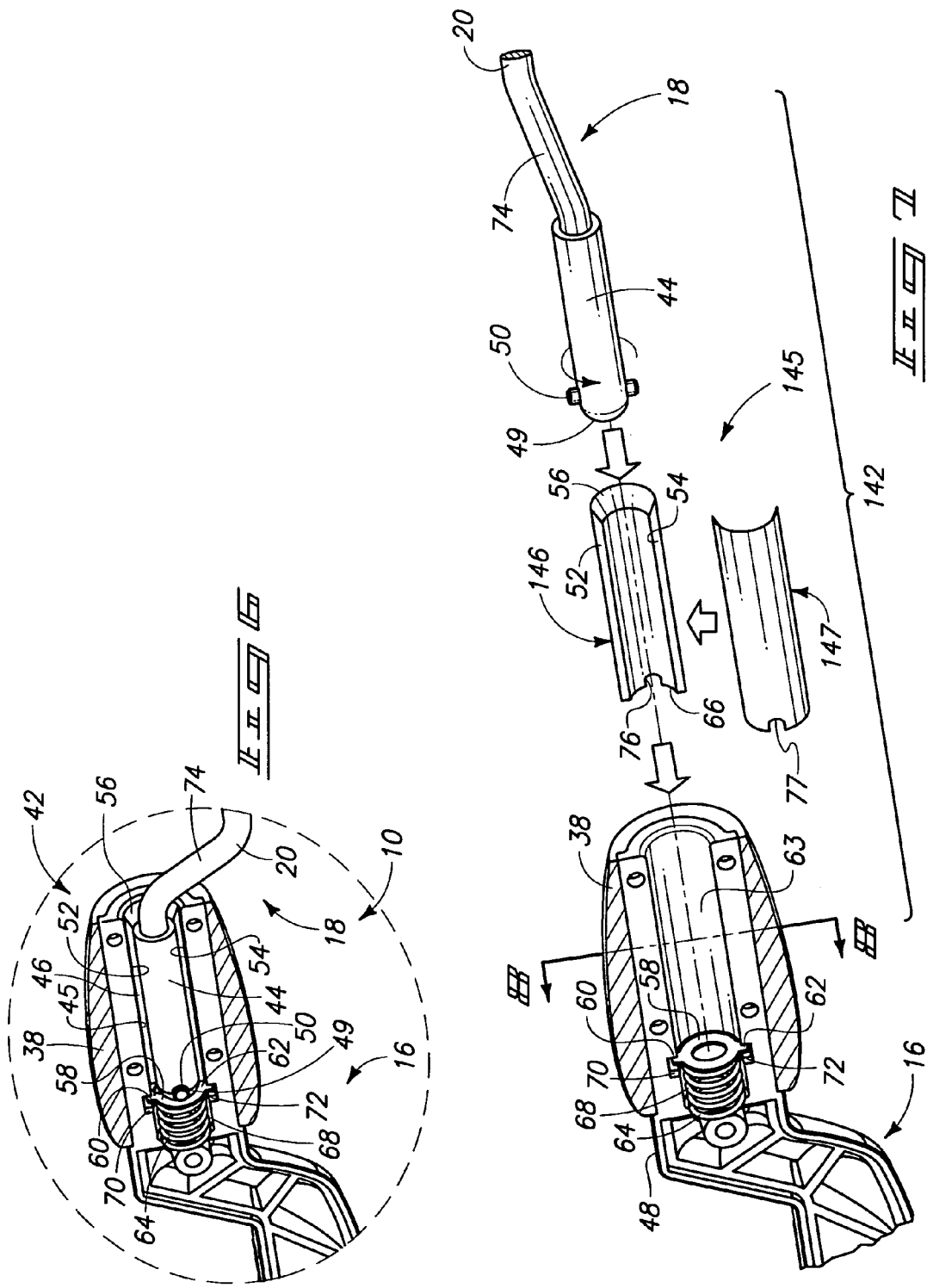

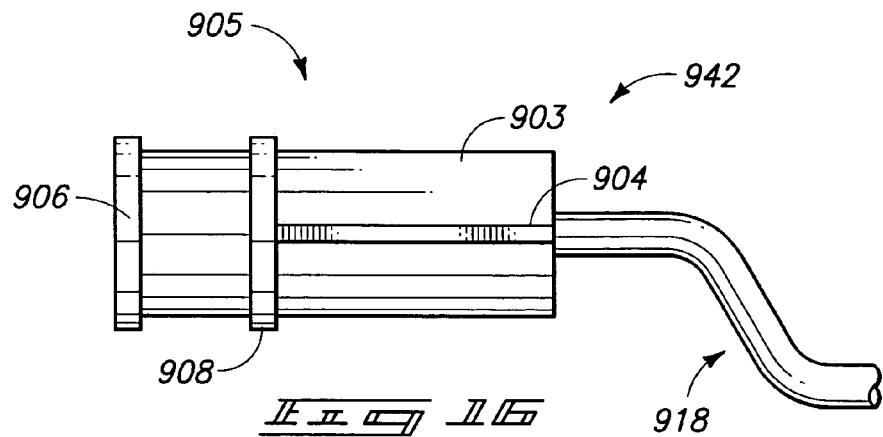
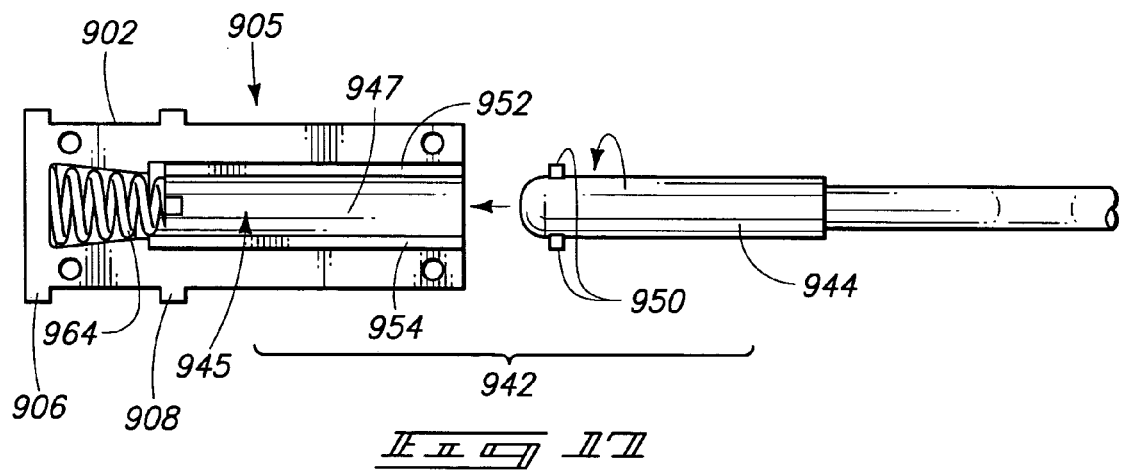
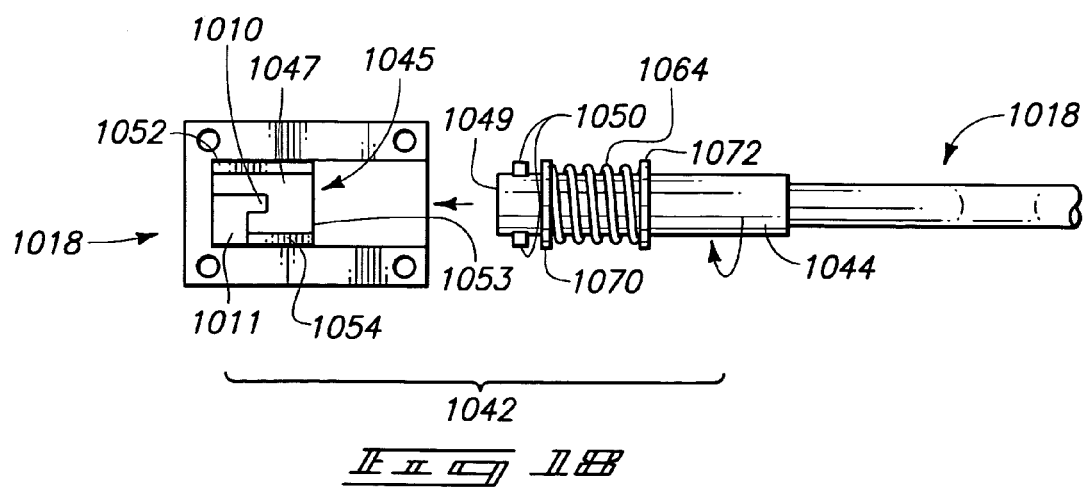

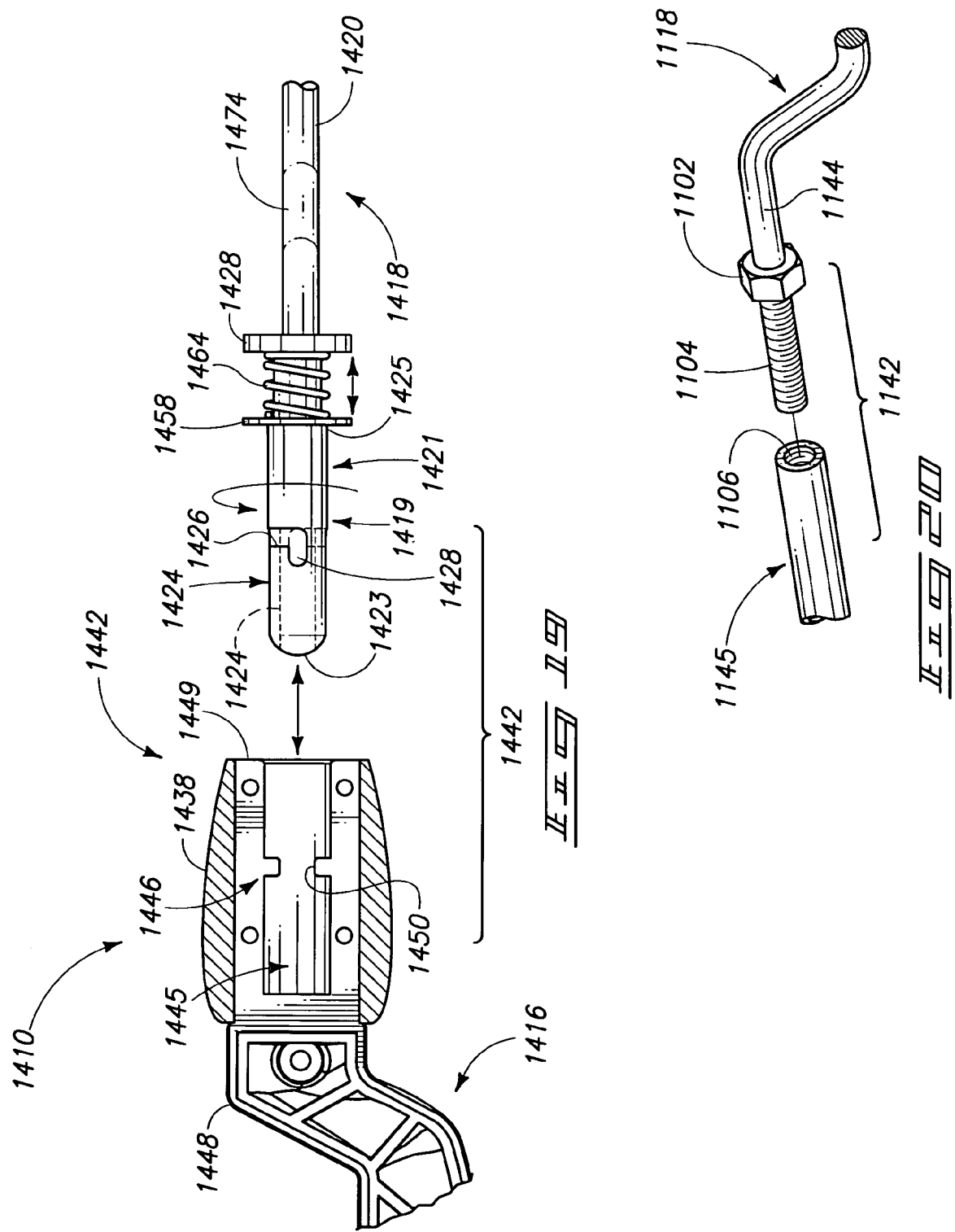

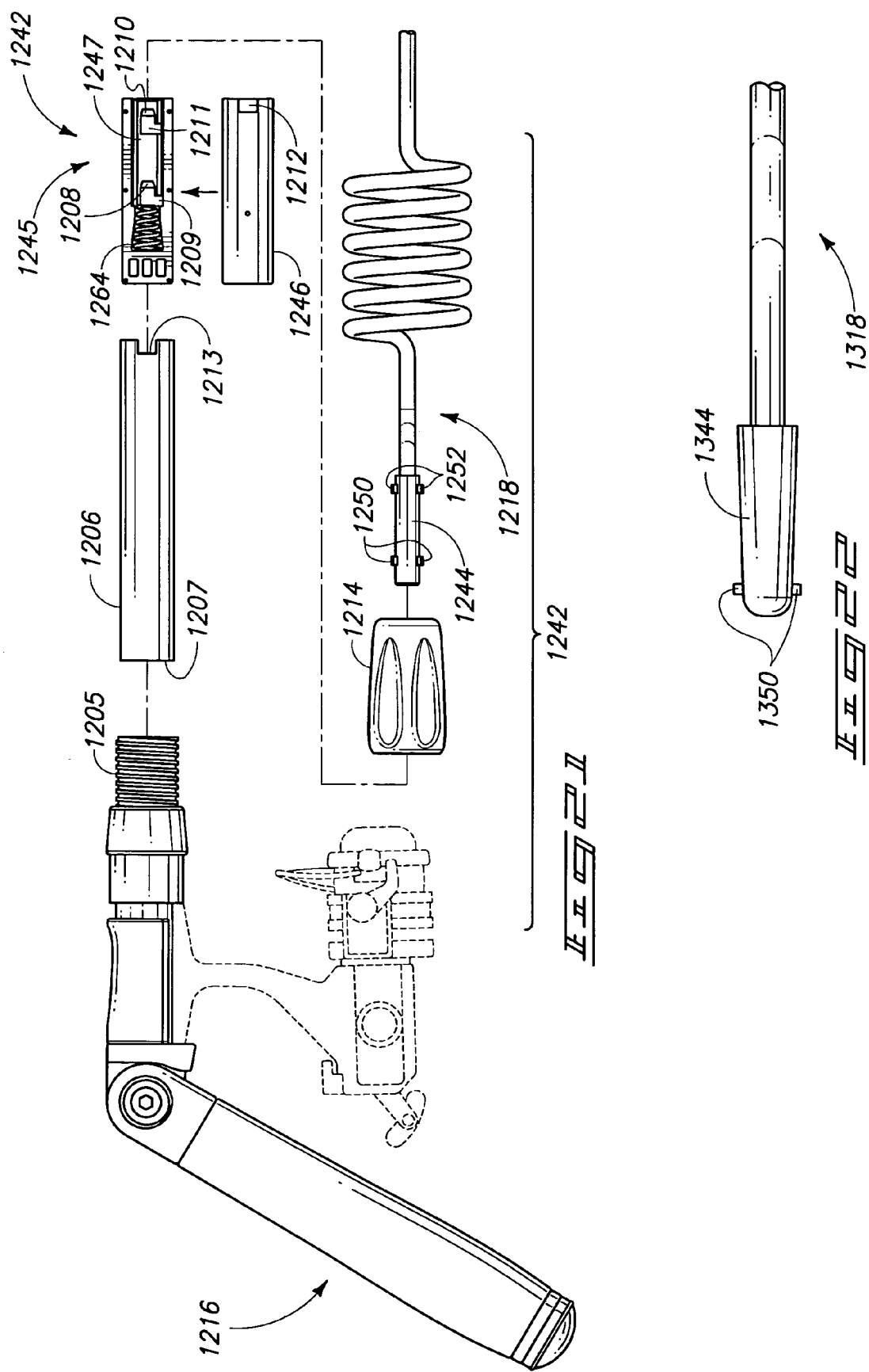

CONNECTOR ASSEMBLY FOR A FISHING POLE

RELATED PATENT DATA

This application is a continuation application of U.S. patent application Ser. No. 10/655,792, which was filed Sep. 4, 2003, now U.S. Pat. No. 6,922,936, entitled "Fishing Rod Connector, and Connector Assemblies for Fishing Poles", and naming Duane C. Markley and Ron Stokes as inventors, and which is incorporated by reference herein.

TECHNICAL FIELD

The present invention pertains to fishing poles, and fishing rods. More particularly, aspects of the invention relate to connector assemblies for fishing poles and fishing rods.

BACKGROUND OF THE INVENTION

A typical fishing pole has a handle, a rod, and a plurality of line guides spaced apart along the rod. Typically, the rod is a straight rod. A reel seat is provided on the handle for supporting a fishing reel. Line from the reel is guided along the rod via the line guides which are axially aligned along the rod. Line leaves the rod at a distal end via a line guide provided on a tip end of the rod. In many cases, the rod includes a plurality of segments that are joined together with ferrules to enable breakdown and storage of the fishing pole. However, these rods are typically 6, 7, 8 or even 9 feet long which means they are not compact, even when broken down and stowed.

Several attempts have been made to provide a compact fishing pole. U.S. Pat. Nos. 2,541,759; 2,559,934; 2,610,427; 3,216,144; 4,027,419; and 5,444,934 disclose various fishing poles with short rods that attempt to provide benefits of longer rods through various structural features.

Fishing rods having high strength-to-weight ratios without abrupt changes in bending strength along their length are desirable. Such strength-to-weight ratios may be achieved using rods wherein the butt end of the rod locks into the end of the handle.

Many fishing rods having a one-piece rod utilize a chuck arrangement at the end of the handle in which threading of the collet of the chuck causes the butt end of the rod to be captured in the chuck. During use, increased stress occurring at the joint between the chuck and the butt of the rod may result in the chuck becoming loose and eventually having the rod break loose from the handle.

In one approach, a rod is secured to the handle of a fishing pole by providing a close tolerance between an end of the rod and a socket formed in the tubular member of the handle. However, since the rod and the handle are not secured against rotation with respect to each other, there is a risk that the reel and line guides may move out of alignment with each other.

Furthermore, such conventional locking devices typically require the provision of close tolerances and snug fit between the end of the fishing rod and the socket of the handle, thereby creating assembly friction from metal-to-metal contact. However, this arrangement requires excessive force to assemble or dismantle the rod from the handle.

In another approach provided by U.S. Pat. No. 3,811,215, a locking device is disclosed for securing a rod to a handle of a fishing rod at a position for a fishing reel.

U.S. Pat. No. 2,559,934 discloses a fishing rod that connects to a resilient support structure. The fishing rod includes a handle for mounting at the butt end of the fishing rod. The butt end of the rod is adapted for mounting in a tube of a nipple having an extension that is configured to extend into and is securely fixed in a hollow tube of a coil spring. The butt end of the rod is slidable into the nipple and is secured therein by a set screw. However, this construction fails to provide ease of convenience in the form of easy assembly and disassembly of the rod from the handle. Furthermore, the handle is not configured to accommodate a variety of fishing rods.

Accordingly, improvements are needed to eliminate the above-described deficiencies.

SUMMARY OF THE INVENTION

A fishing pole is provided having a handle assembly and a fishing rod configured to be removably connected to the handle assembly using a connector assembly. The fishing rod and the handle assembly are fixedly secured against turning with respect to each other, thus reducing the possibility of reel and line guides moving out of alignment with respect to each other. Furthermore, several configurations are provided in order to achieve reliable locking of the fishing rod to the handle assembly while enabling disassembly of the fishing rod from the handle assembly, when desired. The connector assembly that is provided for removably mounting the fishing rod to the handle assembly includes a locking feature for securing the rod to the handle assembly in order to prevent turning of the rod and the handle assembly with respect to each other. In other cases, the connector assembly may be used for removably mounting individual ones of a plurality of fishing rods to the handle assembly.

According to one aspect, a connector assembly for a fishing pole is provided with a first connecting member, a second connecting member, and a spring. The first connecting member has a locking stud. The second connecting member has an L-shaped slot therein for axial receipt of the stud and rotated locking engagement with the stud. The spring is interposed between the first connecting member and the second connecting member. The spring is configured to axially urge apart the first connecting member and the second connecting member when provided in rotated locking engagement therebetween. One of the first connecting member and the second connecting member includes a tapering surface. Another of the first connecting member and the second connecting member includes a mating contact surface configured to mate in engagement with the tapering surface to tighten engagement between the first connecting member and the second connecting member as the first connecting member and the second connecting member are urged apart by the spring.

According to another aspect, a fishing pole is provided which includes a handle assembly, a rod, and a connector assembly. The connector assembly includes a pair of complementary mating connectors configured to removably support the rod from the handle assembly. One of the connectors includes a retaining member having one or more longitudinal engagement grooves extending lengthwise of the retaining member. The retaining member includes one or more retention slots disposed transversely of the longitudinal engagement grooves, and another of the retaining members has one or more projecting fingers extending generally transverse of the retaining member and configured for axial insertion through the longitudinal grooves and transverse displacement into the retaining member upon relative transverse displacement of the handle relative to the rod from a first position to a second position.

According to yet another aspect, a connector assembly for a fishing pole is described. The connector assembly includes an insertion member, a receiving member, and one or more retention slots. The insertion member has one or more outwardly projecting pins. The receiving member has one or more longitudinal engagement grooves along a length of the receiving member. The receiving member includes one or more retention slots displaced laterally of the grooves and configured to receive the one or more outwardly projecting retention pins. The one or more retention pins are received in the one or more retention slots upon insertion and rotation of the rod from a first receiving position to a second locked position.

According to even another aspect, a fishing pole is provided with a handle assembly, a rod, and a retaining member. The rod includes a locking/unlocking end. The locking/unlocking end of the rod includes a pair of outwardly projecting fingers disposed along the rod. The retaining member is provided by the handle assembly and is configured to removably support the rod from the handle assembly. The retaining member has proximal and distal ends. A longitudinal engagement groove formed along a length of the retaining member may be used to guide the locking/unlocking end of the rod from the distal end of the retaining member to the proximal end of the retaining member. The retaining member further includes a pair of retention slots disposed from the groove and configured to receive the pair of projecting fingers upon insertion of the locking/unlocking end of the rod in the retention member via the engagement groove and rotation of the rod from a first position to a second position.

According to yet a further aspect, a fishing pole is provided which includes a handle assembly and a rod. The handle assembly includes a female connector. The rod includes a male connector configured to mate/demate in complementary engagement with the female connector. The male connector has an outwardly projecting finger disposed radially outwardly of the rod. The female connector and the male connector cooperate to provide a connector assembly for removably connecting the rod and the handle. The female connector includes a tubular retaining member having an engagement groove extending lengthwise of the retaining member and configured to guide the rod from a distal end to a proximal end of the retaining member. The retaining member further includes a retention slot disposed laterally of the engagement groove and configured to receive the projecting finger upon insertion of the rod into the retention member via the engagement groove and rotation of the rod from a first position to a second position.

According to even a further aspect, a fishing pole is provided which includes a handle assembly, a rod, and a connector assembly. The handle assembly comprises a handle. The rod is configured to be removably supported by a handle. The connector assembly is configured to mount the rod onto the handle. The connector assembly includes a male member including one or more outwardly projecting fingers disposed about a circumference of the male member. The connector assembly also includes a female member which has an axially extending cavity configured to receive the male member including a receiving member having one or more grooves configured to receive the one or more projecting fingers. The one or more grooves facilitate insertion of the rod from a distal end to a proximal end of the receiving member. The female member also includes a compression member disposed in the cavity and configured to move between first and second compression states, wherein the second compression state has greater compression than the first compression state; and wherein the receiving member includes one or more retention slots configured to lockingly mate with the one or more projecting fingers upon sufficiently urging the compression member from the first compression state to the second compression state using the rod to enable rotation of the rod from a first position to a second position to enable coupling of the rod to the handle.

According to still a further aspect, a fishing pole is provided including a handle assembly, a rod, and a connector assembly. The connector assembly has a first coupling end portion and second coupling end portion, one of the first and second coupling end portions provided by the handle assembly, and another of the first and second coupling end portions provided by the rod. The first coupling end portion includes a first retaining member having one or more longitudinal engagement grooves along a length of the retaining member, a lateral guide surface extending between each groove and a respective slot, and one or more retention slots. The second coupling end portion includes a second retaining member having one or more projecting fingers disposed about a periphery of the second retaining member. The one or more retention slots of the first coupling end portion are configured to receive the one or more projecting fingers of the second coupling end portion upon engagement of the first and second coupling end portions via the engagement grooves and rotation between the first and second coupling end portions from a first position to a second position.

BRIEF DESCRIPTION OF THE DRAWINGS

Preferred embodiments of the invention are described below with reference to the following accompanying drawings.

FIG. 1 is a perspective view of a fishing pole having a connector assembly according to one aspect of the present invention.

FIG. 2 is a side elevational view of the fishing pole of FIG. 1.

FIG. 3 is a plan view of the fishing pole of FIGS. 1 and 2;

FIG. 4 is a partial breakaway perspective view of the fishing pole of FIG. 1.

FIG. 5 is a perspective view of the fishing pole of FIG. 1 including the connector assembly in accordance with another embodiment of the present invention.

FIG. 6 is an enlarged view of a fishing pole connector assembly taken from the encircled region 5 of FIG. 4, and with a rod illustrated as removably mounted in locked engagement with the handle using the connector assembly.

FIG. 7 is an exploded perspective view of the fishing pole of FIG. 1 including an alternatively constructed connector assembly similar to the one depicted in FIGS. 1–6 and showing assembly of tubular insert pieces that cooperate to provide a tubular insert of the connector assembly.

FIG. 16 is a side view, and FIG. 17 is a partially disassembled vertical view of another embodiment of the connector assembly for a fishing pole shown in FIG. 5, but omitting the handle assembly.

FIG. 18 is a partially dissembled vertical view of another embodiment of the connector assembly for a fishing pole shown in FIG. 5, but omitting the handle assembly.

FIG. 19 is a partial breakaway vertical view of a connector assembly for a fishing pole according to another embodiment of the present invention.

FIG. 20 is an exploded partial perspective view of another embodiment of the present invention wherein a proximal end of a rod is provided with threads and a lock nut, and where the threaded end mates with corresponding female threads in a female receiver of a handle in order to mate and lock the rod with the handle assembly of a fishing pole.

FIG. 21 is a partially disassembled and exploded side view of a fishing pole with a connector assembly according to another embodiment of the present invention, the exploded view including a partial breakaway view of a connector assembly configured to engage retention pins on a leading end of a rod within a female receiver of a connector assembly for a fishing pole.

FIG. 22 illustrates a rod having an alternatively constructed rod end portion with a tapered configuration that enables snug assembly of a rod with a handle.

DETAILED DESCRIPTION OF THE PREFERRED EMBODIMENTS

Figure 8:
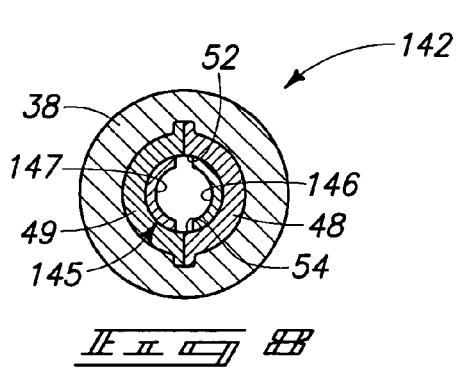
FIG. 8 is a vertical sectional view of the connector assembly taken along line 8—8 of FIG. 7.

This disclosure of the invention is submitted in furtherance of the constitutional purposes of the U.S. Patent Laws "to promote the progress of science and useful arts" (Article 1, Section 8).

Reference will now be made to preferred embodiments of Applicants' invention. Various exemplary implementations are described below and depicted with reference to the drawings comprising fishing poles having handle assemblies, fishing rods and connector assemblies for mounting the fishing rods to the handle assemblies according to various aspects of the present invention. A first embodiment is shown and described below in a first configuration with reference generally to FIGS. 1–5. A second embodiment is shown and described below with reference to FIGS. 6–8. A third embodiment is shown and described below with reference to FIG. 9. A fourth embodiment is shown and described below with reference to FIG. 10. Various other embodiments are shown and described below with reference to FIGS. 11–22.

While the invention is described by way of various preferred embodiments, it is understood that the description is not intended to limit the invention to these embodiments, but is intended to cover alternatives, equivalents, and modifications which may be broader than these embodiments such as are defined within the scope of the appended claims.

Furthermore, in an effort to prevent obscuring the invention at hand, only details germane to implementing the invention will be described in great detail, with presently understood peripheral details being incorporated by reference, as needed, as being presently understood in the art.

A preferred embodiment fishing pole in accordance with the invention is first described with reference to FIGS. 1–6 and is identified by reference numeral 10. Fishing pole 10 removably supports a fishing reel 12 onto which fishing line 14 is spooled for removal and retrieval when casting and retrieving a fishing hook (not shown). Fishing pole 10 includes a handle assembly 16 that supports a rod 18. According to one construction, rod 18 is removably supported for mating and demating with handle assembly 16 using a connector assembly. One suitable connector assembly is described below with reference to FIGS. 4–6. Alternative connector assemblies are provided as shown in FIGS. 7–22 according to various aspects.

As shown in FIG. 1, fishing rod 18 includes a base 20 which supports an outer coil spring 22 and an inner coil spring 24. A first rod portion 26 is carried distally of outer coil spring 22. Additionally, a second rod portion 28 is carried distally of inner coil spring 24. Fishing rod 18 has a dual-tip construction wherein first rod portion 26 terminates in a first line guide 30 at a distal end and second rod portion 28 terminates in a second line guide 32 that is provided intermediate first line guide 30 and base 20.

More particularly, FIGS. 1 and 2 illustrate such a dual-tip construction wherein first rod portion 26 is substantially longer than second rod portion 28, and wherein first rod portion 26 and second rod portion 28 diverge from base 20 relative to one another so as to separate rod portions 26 and 28 at the respective distal ends. In order to achieve such a diverging, dual-tip construction, first rod portion 26 and second rod portion 28 each deviate from axial alignment in an upward direction away from a direction of bend that would be imparted by fishing line tension being applied to rod 18 while landing a fish. In essence, each of the first rod portion 26 and the second rod portion 28 comprises an arcuate section that is shaped upwardly and away from a direction of loading when retrieving a fish. Because of this upward shape, a connector assembly is needed that prevents rotation of rod 18 relative to handle assembly 16.

As shown in FIGS. 1–3, handle assembly 16 includes a reel seat 34 which is provided along a top surface. A threaded ring 36 mates with complementary threads on handle assembly 16 to move ring 36 forward and aft along handle assembly 16 to entrap a reel 12 atop reel seat 34, as shown in FIGS. 1 and 2. Such a construction of a reel seat 34 is configured for mounting a casting reel 12 atop handle assembly 16 and is well understood in the art. Alternatively, varying other types of reels can be incorporated for mounting onto a reel seat 34 of handle assembly 16.

As shown in FIG. 2, rod 18 is shown in an unloaded state, and is further shown in dashed lines in a deformed state when fishing line 14 is loaded while retrieving a fish. More particularly, first rod portion 26 is initially bent along with coil spring 20. First rod portion 26 is longer than second rod portion 28 such that first line guide 30 is spaced significantly further away than second line guide 32 from reel 12. Hence, a greater bending moment is imparted to first rod portion 26 when a fish loads fishing pole 10. As first rod portion 26 is downwardly deformed, outer coil spring 22 is also deformed until outer coil spring 22 begins to contact with inner coil spring 24. Such contact actually stiffens and strengthens the combination of coil springs 22 and 24 so as to impart some additional bending stiffness to first rod portion 26. Subsequently, first rod portion 26 continues to bend to an even greater degree. As first rod portion 26 is displaced downwardly an ever-increasing amount, angulation of line 14 to second line guide 32 is increased as line 14 leaving second line guide 32 to pass through first line guide 30 (in the deformed downward position) increases the triangulation and loading of second rod portion 28. As this effect is increased, second rod portion 28 is more greatly loaded, which imparts additional bending stiffness to rod 18. Second rod portion 28 is then downwardly bent, along with inner coil spring 24, so as to impart additional bending stiffness to rod 18. Even furthermore, coil spring 24 is loaded to an even greater degree, which adds additional bending stiffness as the rod is further downwardly deformed by loading via line 14.

Also shown in FIGS. 1–3, a receiver 38 is configured to removably receive rod 18 from handle assembly 16 pursuant to the construction depicted in FIGS. 4–7 below. Receiver 38 is provided at a distal end of handle assembly 16, with a handle 40 being provided at a proximal end of handle assembly 16. Receiver 38 may be formed as a unitary piece from the distal end to the proximal end of the handle assembly 16. FIGS. 4–7 illustrate construction of a quick connection assembly 42 that is used to mount rod 18 onto handle assembly 16. Handle assembly 16 is constructed from a pair of mating left and right handle assembly shells, such as handle assembly shell 48.

Alternatively, handle assembly 16 can be made from a single piece, or from multiple pieces that are attached end-for-end, or by some other means. For example, handle assembly 16 can be made using multiple insert pieces, such as by providing insert piece 46 as a separate piece. Optionally, insert piece 46 can be integrally molded into handle assembly 16 so as to form a half cylinder therein. In order to facilitate an understanding of construction for quick connection assembly 42, only handle assembly shell 48 is shown in FIGS. 4–6, with the opposed handle assembly shell 47 being removed to facilitate viewing therein.

As shown in FIG. 4, a slightly enlarged cylindrical rod end 44 is integrally formed on base 20 of rod 18 and is sized to be axially received within a female receiver 45 of quick connection assembly 42. Accordingly, rod end 44 forms a male receiver that removably mates and demates with female receiver 45.

FIG. 5 shows an enlarged view of a fishing pole connector assembly 42 taken from the encircled region 5 of FIG. 4. More particularly, FIG. 5 shows rod 18 removed/uncoupled from the female receiver 45 while FIG. 6 shows rod 18 as locked in mating engagement with female receiver 45. The connector assembly 42 includes a tubular formed piece 46 to provide a mating surface within female receiver 45 for receiving rod end 44, as shown in FIG. 5, wherein rod 18 is removed from connector assembly 42.

In one case as shown in FIG. 5, formed piece 46 is molded or cast into shell 48. In another case as illustrated in FIG. 7, retaining member/female receiver 145 includes a formed piece 146 comprising a half cylinder, and a complementary insert piece 147. The formed piece 146 is inserted and fastened with rivets, screws, or adhesive into shell 48. Likewise, the complementary insert piece 147 is inserted and fastened with rivets, screws, or adhesive into a handle assembly shell that is complementary to shell 48. Receiver 38 includes an axial cavity formed by the handle assembly (such as shell 48). In the embodiment shown in FIG. 5, female receiver 45 is formed by cooperation of formed piece 46 and a complementary formed piece, and slots 52 and 54 are formed along the length of female receiver 45. In another embodiment, female receiver 45 may be made from a single tubular member as shown in FIG. 21.

Continuing to refer to FIG. 5, rod end 44 has a pair of exposed retention pin ends 50 (or optionally a single cross-pin) which both extend radially outwardly from the free end of rod end 44, positioned at locked or in-use 3:00 o'clock and 9:00 o'clock positions in assembly, as shown in FIG. 6. In one case, a single cylindrical pin is press-fit into and through a cross-bore in rod end 44 so that opposed opposite ends of the pin provide pin ends 50. In one embodiment, the retention pin ends 50 (or projecting fingers) may extend radially outwardly from leading end 49 of rod 18. In another embodiment, the projecting fingers may extend inwardly as illustrated by fingers 1450 in FIG. 19. In order to facilitate assembly, female receiver 45 includes a pair of longitudinal slots 52 and 54 that receive rod end 44 of rod 18 when rotated 90 degrees from an operating position to place it into an insertion position such that retention pin ends 50 are provided at 12:00 o'clock and 6:00 o'clock positions.

Accordingly, retention pin ends (or pins) 50 are received longitudinally and axially within longitudinal slots 52 and 54, after initially receiving rod end 44 within frustoconical entrance portion 56. Upon receiving rod end 44 in the rotated, insertion position, leading end 49 of rod end 44 is urged against a base plate 58 so as to compress a coil spring 64 of female receiver 45. A pair of dog legs 60 and 62 on base plate 58 restrain motion of base plate 58 between maximum compressed (e.g., a second position) and unpressed positions (e.g., a first position) by way of a pair of slots 70 and 72, as shown in FIGS. 5–6. The base plate 58 is provided for urgable engagement with the coil spring 64 and configured to engage the proximal end (e.g., leading end 49) of rod 18 to bias the one or more projecting fingers 50 into the one or more retention slots 76.

In one embodiment, the retention pin ends 50 (or projecting fingers) may extend radially outwardly from leading end 49 of rod 18. In another embodiment, the projecting fingers 50 may extend inwardly as illustrated by reference numeral 1450 in FIG. 19. In order to facilitate assembly, female receiver 45 includes a pair of longitudinal slots 52 and 54 that receive rod end 44 of rod 18 rotated 90 degrees from an operating position or insertion position such that retention pin ends 50 are provided at 12:00 o'clock and 6:00 o'clock positions.

An inner end 66 of tubular insert piece 46 of female receiver 45 includes a pair of receiving grooves 76 each sized to receive one of retention pin ends 50 securely and rotationally fixed therein, after compressing base plate 58 and coil springs 64 sufficiently to enable rotation of rod 18 and pin ends 50 sufficiently to orient pin ends 50 at the in-use 3:00 o'clock and 9:00 o'clock positions. As noted above, rod end 44 and retention pins 50 are received by receiver 45, the pins aligned at 12:00 o'clock and 6:00 o'clock positions, generally referred to as the "insertion position".

Once rod end 44 is received by receiver 45, it is urged into a locking position as described above by rotating the rod from the insertion position to the in-use 3:00 o'clock and 9:00 o'clock positions, generally referred to as the "in-use position". For example, the engagement grooves 52 and 54 and the retention slots 76 may be provided at an angle of 90 degrees with respect to one another. In this exemplary embodiment, once rod 18 is inserted in receiver 45, it may be rotated either in clockwise or counterclockwise directions by an angle of 90 degrees so as to rotate the rod 18 from the insertion position to the in-use position. Upon rotation of rod 18 from the insertion position to the in-use position, coil spring 64 urges base plate 58 back into an extended position such that retention pin ends 50 (of FIGS. 5–6) are securely retained within receiving grooves 76 as shown in FIG. 6. Accordingly, rod 18 of FIG. 4 is securely retained in the in-use position by way of the resulting quick connector assembly 42.

In order to remove rod 18 from handle assembly 16, a user merely axially forces rod 18 into quick connection assembly 48 so as to cause compression of spring 64. Subsequently, the rod is rotated such that pin ends 50 are moved to the insertion position (e.g., 12:00 o'clock and 6:00 o'clock positions) from the in-use position (e.g., 3:00 o'clock and 9:00 o'clock positions), respectively, for removal of rod end 44 and pin ends 50 via the longitudinal slots 52 and 54.

As shown in FIGS. 5–6, spring 64 is provided within a co-axial bore 68 that is formed between the pair of handle assembly shells (where shell 48 provides one of the pair of complementary shells).

FIG. 7 is an exploded perspective view of an alternatively constructed fishing pole (similar to the one shown in FIG. 1) including an alternatively constructed connector assembly 142 (similar to the one shown in FIG. 5) prior to assembly together of tubular insert pieces 146 and 147 forming a tubular insert of the connector assembly, in accordance with another embodiment of the present invention. Tubular insert pieces 146 and 147 form two complementary pieces that form a tube within the pair of handle assembly shells. Tubular insert piece 147 may be fixed in an assembly shell (not shown) that is complementary to the assembly shell 48. Upon fixing of tubular insert piece 147 in the complementary assembly shell (not shown) with adhesive, fasteners or welding, tubular insert piece 147 together with the complementary shell are urged in the direction shown by the arrow in FIG. 7 in order to create a tubular insert (e.g., female receiver 145) of the connector assembly. That is, upon assembling the handle assembly shells via fasteners, the pair of handle assembly shells and insert pieces 146 and 147 provide for a tubular insert piece (e.g., female receiver 145) within the pair of handle assembly shells (e.g., shell 48 and its complementary shell (not shown)) that receives and retains rod end 44 of rod 18.

Additionally, as shown in the two embodiments of FIG. 6 and FIG. 7, a kick-down portion 74 is provided along base 20 of rod 18 that helps to orient an axial portion of rod 18 in a desired location relative to handle 40 and reel seat 34 (see FIG. 4). The length and angle of kick-down portion 74 can be varied in order to modify the relative elevation of the axial portion of the rod relative to the handle, depending on the configuration of a fishing reel being utilized in conjunction with the handle.

According to one construction, handle assembly shells, including handle assembly shell 48, are formed from a single piece of die cast aluminum. According to another construction, the handle assembly shells are formed from a plastic, or filled plastic material, such as a carbon or graphite filled plastic material or fiberglass material.

FIG. 8 is a vertical sectional view of the connector assembly shown in FIG. 7 (but assembled together), wherein the tubular insert (e.g., female receiver 145) is configured as a plurality of tubular pieces (e.g., tubular insert pieces 146 and 147) as described above at FIG. 7.

Figure 9:
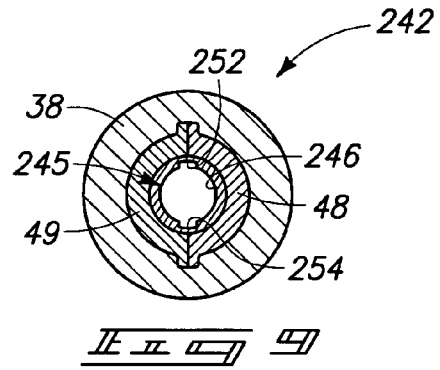
FIG. 9 is a vertical sectional view of the connector assembly according to another embodiment, wherein the retaining member is formed from a single tubular piece having a plurality of longitudinal grooves extending along an inner periphery of the retaining member for receiving a plurality of projecting fingers of a rod portion.

FIG. 9 is a vertical sectional view of the connector assembly in accordance with another aspect of the present invention, wherein the tubular retaining member 245 (similar to female receiver 145 of FIG. 7) is configured from a single tubular member 246 having a plurality of longitudinal grooves 252 and 254 extending along a length of tubular member 246 in an inner peripheral surface of tubular member 246. Grooves 252 and 254 are configured to receive projecting fingers 50 of rod 18 shown in FIG. 7. Other than female receiver 245 being configured as shown in FIG. 9, the rest of the operation of mounting a rod to a handle using a connector assembly is similar to what has been described above with regard to the embodiments of FIGS. 4–7.

Figure 10:
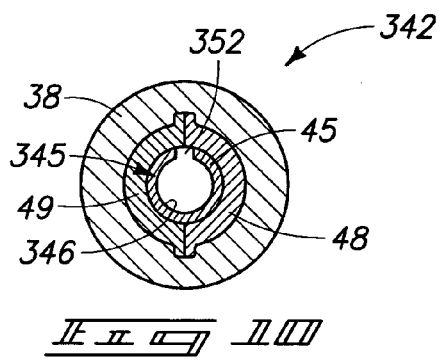
FIG. 10 is a vertical sectional view of the connector assembly according to yet another embodiment, wherein the retaining member (e.g., female receiver) is formed from a single tubular piece having a single longitudinal groove extending along the retaining member for receiving a projecting finger of a rod portion.

FIG. 10 is a vertical sectional view of another alternatively constructed connector assembly in accordance with another aspect of the present invention, wherein the tubular female receiver 345 is configured from a single tubular member 346 having a single longitudinal groove 352 extending along a length of tubular member 346. Groove 352 is configured to receive a projecting finger 50 of rod 18 (FIG. 7). It will be appreciated that a rod 18 having a receiving end 44 and having a single projecting finger/retaining pin 50 may be used in order to mate in locking engagement with member 346. But for member 346 being configured as shown in FIG. 10, the rest of the operation of mounting rod 18 to handle 16 using connector assembly 42 is similar to what has been described above with regard to the embodiments of FIGS. 4–7.

Figure 11:
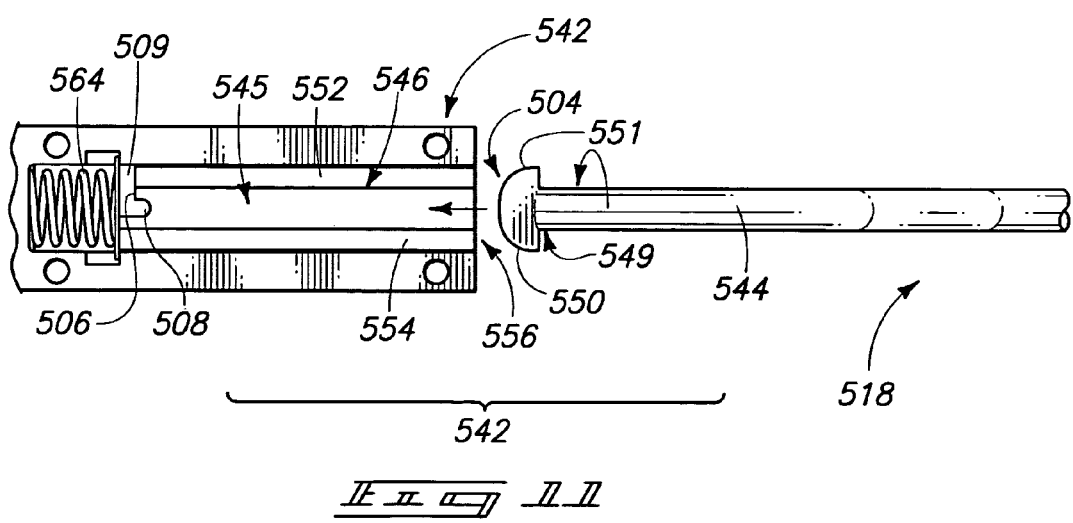
FIG. 11 is a partial breakaway vertical view of another embodiment of a connector assembly for a fishing pole shown in FIGS. 5–7 including the connector assembly with a tubular insert piece (with one shell removed) disposed in a cavity to receive a rod that is illustrated as removed from the connector assembly.

FIG. 11 is a partial breakaway vertical view of yet another embodiment of the fishing pole shown in FIGS. 1–6 including a connector assembly having a tubular insert piece made from two shells and disposed in a cavity configured to receive a rod illustrated as removed from a connector assembly 542. A rod 518 is shown as removed/uncoupled from female receiver 545. A leading end 549 of rod 518 includes a tabbed member 504 in the form of a D-end crimped member. The tabbed member 504 includes a pair of retention members 550, 551 formed by crimping, or forging, member 504 on the leading end 549 of rod 518. The retention members 550, 551 provide fingers that are configured for engagement in retention slot 508 of female receiver 545 of connector assembly 542. The tubular insert piece 546 provided in the female receiver 545 includes an edge 506 disposed near an end of the tubular insert piece 546 and proximal to coil spring 564. Edge 506 enables unlocking/uncoupling of rod 518 by way of rotation in a single direction (e.g., clockwise) as rod 518 is forcibly urged into receiver 545 to compress spring 564. The end recess of edge 506 prevents unlocking/uncoupling of rod 518 by rotation of the rod in a direction opposite to the direction indicated by the arrow as in FIG. 11.

Continuing to refer to FIG. 11, female receiver 545 is formed from insert piece (or shell) 546 and a complementary insert piece (not shown). Axial slots 552 and 554 are formed along the length of female receiver 545. Retention members 550, 551 of tabbed member 504 are received longitudinally and axially within longitudinal slots 552 and 554, respectively, after initially receiving leading end 549 of rod 518 at entrance portion 556 of female receiver 545. Upon receiving rod 518 into female receiver 545 so as to compress spring 564 and clear edge 506, rod 518 is rotated 90 degrees to an in-use position from the insertion position in order to lock and engage retention members 550, 551 into respective retention slots 508 by way of a transverse entrance portion 509 that communicates with each retention slot 508. By working in reverse order, the pair can be unlocked. The operation of connector assembly 542 is similar to the operation of the connector assembly described above with reference to FIGS. 4–6, and therefore will not be repeated.

In another embodiment, instead of having a tabbed member 504 (including retention members 550, 551) on rod 518, a pair of retention pins 950 as indicated in FIG. 17 may be used, further details of which are provided below with reference to FIG. 17.

Figure 12:
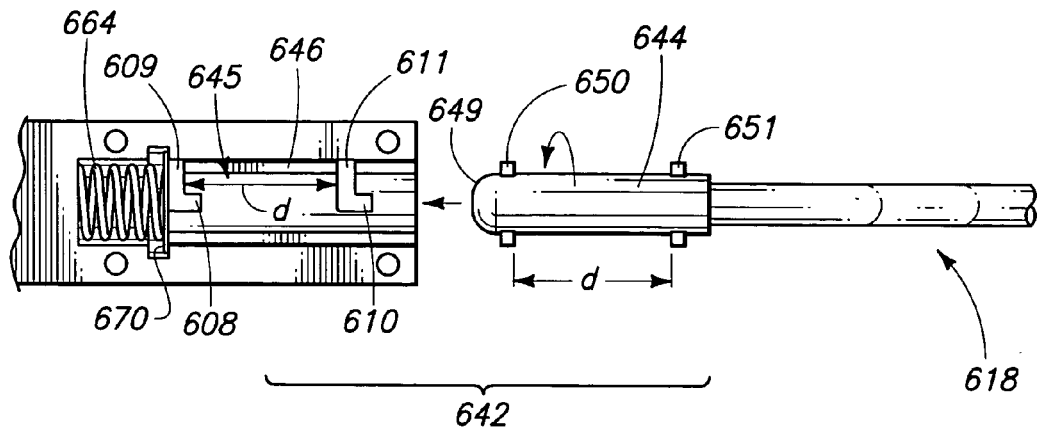
FIG. 12 is a partial breakaway vertical view of yet another embodiment of the connector assembly for a fishing pole shown in FIGS. 5–7.

FIG. 12 is a partial breakaway vertical view of another embodiment of connector assembly 642 for a fishing pole (similar to the embodiment shown in FIG. 5). As shown in FIG. 12, a male member 644 of rod 618 is removed from a complementary female receiver 645. One of the shells has been omitted in order to facilitate viewing. However, it is understood that female receiver 645 is constructed similar to the female receiver of FIG. 8. A tubular insert piece (formed from two shells) 646 includes a pair of retention slots 608, 610, respectively, in each shell and having respective, transverse entrance portions 609, 611. The retention slots 608, 610 are provided in the tubular insert piece 646 spaced at a distance "d" with respect to each other. Similar to the embodiment of FIG. 7, another tubular insert piece (not shown) complementary to the tubular insert piece 646 is retained within connector assembly 642.

Rod 618 includes a pair of retention pins 650, 651, which are spaced apart with respect to each other a distance "d" corresponding to the distance "d" between retention slots 608, 610. The retention pins 650, 651 may be provided on either side of the receiving rod end (or member) 644 as shown in FIG. 12, or may be alternatively provided only on one side of the receiving rod end 644. Upon insertion of rod 618 into female receiver 645, the pair of retention pins 650, 651 engage and mate in locking engagement with the pair of retention slots 608, 610, respectively.

But for the differences disclosed herein, the rest of the features depicted in FIG. 12 are similar to what has been described above with regard to the embodiment of FIG. 5. In one case, a single cylindrical pin is press-fit into and through each of a pair of cross-bores in rod end 644 so that opposite ends of the pins provide pin ends 650, 651, respectively. In another case, short pins are inserted into opposed bores in an outer circumferential surface of rod end 644 without passing completely through rod end 644. In one case, pins 650, 651 are made from metal such as steel or aluminum. In another case, retention pins 650, 651 are integrally formed from rod end 644 by machining rod end 644 from a single piece of metal, such as aluminum.

Figure 13:
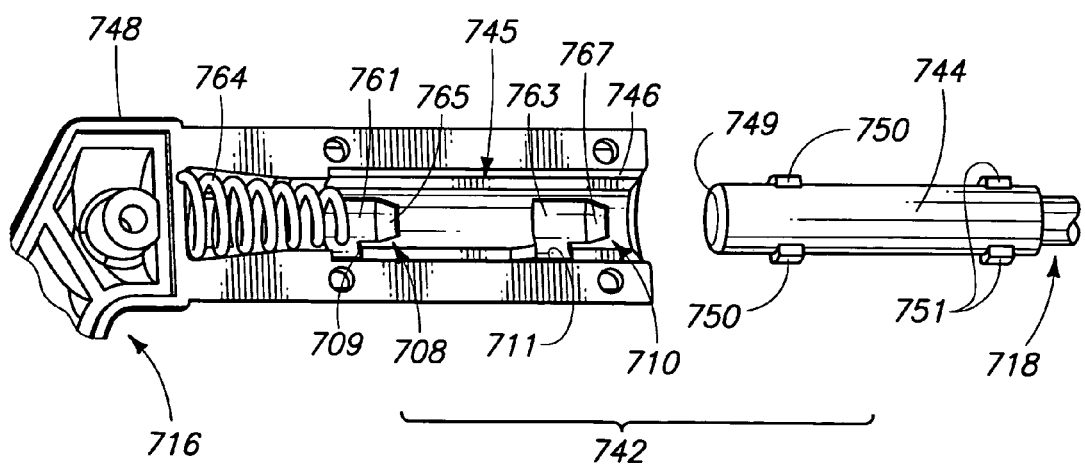
FIG. 13 is a partial breakaway vertical view of even another embodiment of the connector assembly for a fishing pole shown in FIG. 12.

FIG. 13 is a partial breakaway and disassembled vertical view of another embodiment of a connector assembly 742 for a fishing pole that is slightly different than the embodiment of FIG. 12. In this embodiment, a rod end 744 of a rod 718 includes pairs of retention pins 750, 751 (or projecting fingers) that extend radially outwardly from leading end 749 of rod 718. Furthermore, coil spring 764 is shown to be conically tapered from one end to the other. The tapered configuration of coil spring 764 eliminates the need for a washer (or base plate) that might otherwise be required with the coil spring configuration shown in FIG. 5. The remaining construction details for the operation of the device of FIG. 13 are similar to what has been described above with regard to FIG. 12.

As depicted in FIG. 13, female receiver 745 is formed by a shell-shaped inserts, such as insert 746. Each insert forms a portion of a cylindrical tube into which a pair of retention slot 708, 710 are machined for receiving pins 750, 751, respectively. The inserts, such as insert 746, are glued into a cylindrical bore within handle shell 748 using an adhesive, such as an industrial grade epoxy adhesive. Retention slots 708, 710 each include a cylindrical portion 761, 763 and a frustoconical portion 765, 767, respectively. Each cylindrical portion 761, 763 communicates directly with the respective transverse entrance portion 709, 711. As a respective pin 750, 751 is received into portion 709, 711, rod end 744 is rotated to bring pin 750, 751 into respective cylindrical portion 761, 763, while compressing spring 764. Spring 764 urges rod end 744 outwardly such that pins 750, 751 are forced into engagement with frustoconical portions 765, 767 so as to snugly render rod end 744 within connector assembly 742 so as to prevent any looseness between the rod end and the handle.

Figure 14:
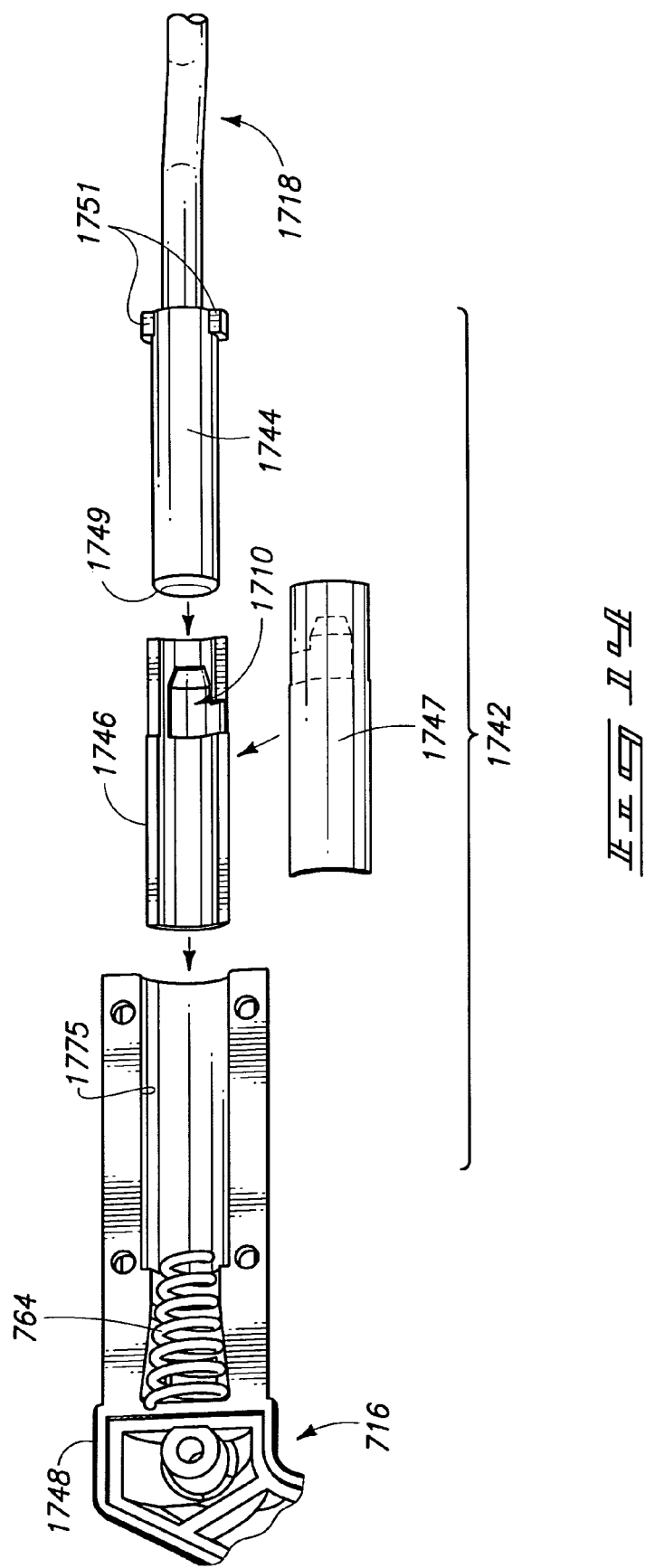
FIG. 14 is a partial breakaway and exploded perspective view of a connector assembly for a fishing pole as shown in FIG. 13.

FIG. 14 is a partial breakaway and exploded perspective view of an alternative connector assembly 1742 for a fishing pole similar to connector assembly 742 of FIG. 13, and prior to assembly of tubular insert pieces 1746 and 1747 into handle shells (such as shell 1748), pieces 1746 and 1747 cooperate to form a tubular insert of the connector assembly 1742. Tubular insert pieces 1746 and 1747 form two complementary, mating pieces that that cooperate to provide a tube that is glued between a pair of handle assembly shells (such as shell 1748) as shown and described with reference to the embodiment of FIG. 7.

Figure 15:
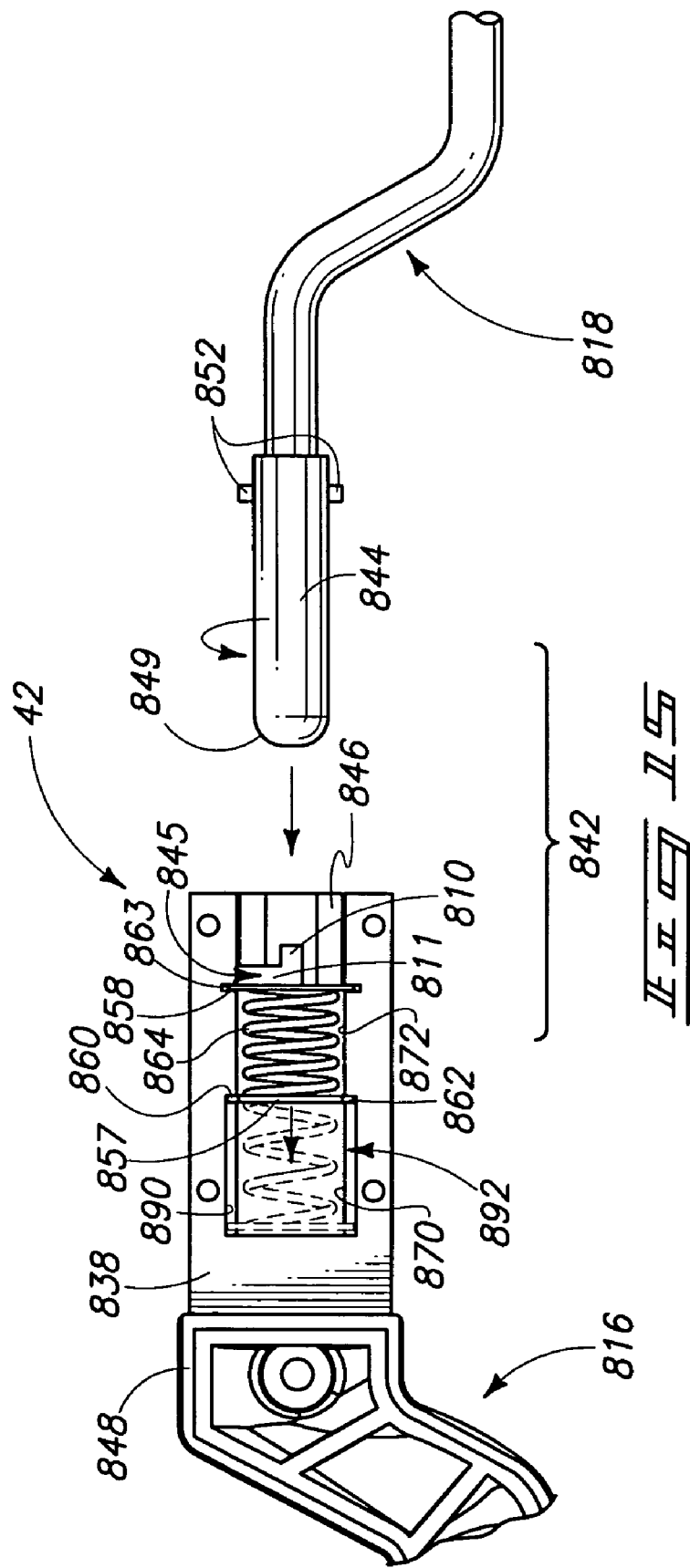
FIG. 15 is a partial breakaway vertical view of another embodiment of a connector assembly for a fishing pole shown in FIG. 5.

FIG. 15 is a partial breakaway vertical view of another embodiment of a connector assembly 842 for a fishing pole (over that shown in FIG. 5). In this embodiment, a rod 818 (or male member) is shown to be removed/uncoupled from female receiver 845. The connector assembly 842 includes a tubular insert piece 846 made from two shells and configured to provide a mating surface within female receiver 845 for receiving rod end 844. A receiver 838 in handle shell 848 includes respective cavities A and B formed by the assembly of shell 848 and its complementary substantially mirror-image shell (not shown). A coil spring 864 is provided in central bore 872 of female receiver 845. In operation, a leading end 849 of rod 818 is passed through a hole in a washer plate 858, through spring 864, and is urged against a cylindrical base plate 857. Upon sufficiently urging the base plate 857 with the leading end 849 of rod 818, spring 864 extends into bore 870 (as indicated in FIG. 15) of female receiver 845. A pair of dog legs 860 and 862 on base plate 857 guide motion of base plate 857 along slots 890, 892 between maximum compressed (extension of spring 864 into bore 870) and unextended positions (prior to extension into bore 870).

The base plate 857 is provided for urgable engagement with one end of the coil spring 864. A second end of spring 864 is configured to be fixed to a second washer-shaped base plate 858 having dog leg ends that are trapped in slots 863. Leading end 849 of rod 818 is inserted into a coaxial cavity inside the coils of spring 864 and through base plate 858. Upon insertion, leading end 849 of rod 818 urges against base plate 857. Increased stiffness is experienced by rod 818 as coil spring 864 is stretched into bore 870 due to urging of leading end 849 of rod 818. Operation of the rod to lock/couple and uncouple from female receiver 845 is similar to the operation that has been described above with regard to FIG. 5. In one exemplary case, instead of having one set of retention pins 852 on a rod end 844, a pair of retention pins as shown in FIG. 12 may be provided. In such a case, female receiver 845 is configured to have a corresponding pair of retention slots to receive the pair of retention pins to provide locking engagement of rod 818 in the retention slots.

FIG. 16 is a side view and FIG. 17 is a partially disassembled vertical view of another embodiment of a connector assembly 942 for a fishing pole (similar to that shown in FIG. 5) using a pair of tubular insert pieces, but with one piece removed in FIG. 17. Connector assembly 942 provides an insert piece 905 that includes a first shell 902 (see FIG. 17) and a second, complementary shell 903 (see FIG. 16) that cooperate to provide a female receiver 945. Shell 902 is made separately and is affixed to the other shell 903, after inserting spring 964. One shell includes alignment pins and the other shell includes bores for receiving the pins to facilitate aligned assembly. For example, such affixing may be done using an adhesive (such as epoxy), or the shells may be welded together, or formed from a single piece of material. Shell 902 receives a spring member (e.g., a coil spring) 964, and cooperates with shell 903 (see FIG. 16) to provide a female receiver 945 into which a pair of complementary tubular insert pieces are fastened or glued, one of which is shown as insert piece 947 in FIG. 17. Female receiver 945 includes one or more longitudinal anti-rotation ribs 904 (see FIG. 16) on an outer surface that extend longitudinally from one end to the other. Ribs 904 are provided to prevent axial rotation of receiver 945 when trapped in complementary slots provided between handle shells (such as shell 48 of FIGS. 5–7).

In addition to having a longitudinal rib 904 on either side of receiver 945, a pair of circumferential ribs 906 and 908 is also provided on receiver 945. In operation, longitudinal ribs 904 prevent rotation of receiver 945 when entrapped between a pair of handle shells. Furthermore, circumferential ribs 906 and 908 prevent axial removal of receiver 945 from between a pair of handle shells when assembled together in the form of a handle. It is understood that such a pair of handle shells has complementary slots configured to receive, in assembly, ribs 904, 906 and 908 and an aperture to receive receiver 945.

Semi-cylindrical insert piece 947 includes longitudinal slots 952 and 954 formed along the length of female receiver 945. The pair of longitudinal slots 952 and 954 axially receive pins 950 on rod end 944. Remaining operation of the locking engagement of rod end 944 in female receiver 945 is similar to the operation as described in the embodiment of FIGS. 4–6.

FIG. 18 is a partially disassembled vertical view of another embodiment of a connector assembly 1042 for a fishing pole (similar to that shown in FIG. 5). It is understood that connector assembly 1042 is received between a pair of handle shells (not shown) to form a handle assembly (not shown). In this embodiment, a spring member (e.g., coil spring) 1064 is provided in a rod end portion 1044 of rod 1018, and a tubular insert piece 1047 (made from a pair of shells) is provided in a female receiver 1045. The rod end 1044 further includes a pair of retention pins 1050 provided on an end that is proximal to female receiver 1045 of handle assembly 1018. Spring member 1064 is disposed between base plates 1070 and 1072. Base plate 1070 is configured with a central hole to slide along rod end 1044 from a first position to a second position upon insertion of leading end 1049 of rod 1018 into receiver 1045, while base plate 1072 is rigidly affixed onto rod end 1044. Upon insertion of leading end 1049 of rod 1018 into female receiver 1045, retention pins 1050 are received axially and longitudinally within longitudinal slots 1052 and 1054, and base plate 1070 is restrained by edge 1053 of tubular insert piece 1047. Retention pins 1050 are engaged to lock into retention slots provided between the insert pieces (similar to that shown in FIG. 5).

FIG. 19 is a partial breakaway vertical view of even another embodiment of a connector assembly for a fishing pole 1410. The fishing pole includes a handle assembly 1416 having a handle assembly shell 1448. In order to facilitate an understanding of the construction of connector assembly 1442, only a single handle assembly shell 1448 is shown, with the opposed/complementary handle assembly shell being removed to facilitate viewing therein. Such shells are held together with threaded fasteners (not shown).

Connector assembly 1442 includes a first coupling end portion 1421 (provided by a cylindrical rod end fitting) that is glued onto a base 1420 of rod 1418 and is sized to be axially received within a second coupling end portion 1445 (provided by a female receiver). Portion 1421 is machined from aluminum and has a bore that receives epoxy glue and is sized to receive a proximal end of rod 1418. Accordingly, the first coupling end portion 1421 forms a male member that removably mates and demates with second coupling end portion 1445. The first coupling end portion 1421 includes a pair of retaining members 1419 each having a longitudinal engagement groove 1424. Each retaining member 1419 also has a lateral guide surface 1426 and one or more retention slots 1428. In one embodiment, the engagement groove 1424 extends from a proximal end 1423 of the first coupling end portion 1421 and leads to retention slot 1428 via the lateral guide surface 1426. The lateral guide surface 1426 extends between groove 1424 and a respective slot 1428.

In order to facilitate assembly, the second coupling end portion 1445 includes a pair of projecting fingers/retention pins 1450 configured for locking engagement in retention slots 1428 of the first coupling end portion 1421. In one embodiment, coupling end portions 1445 is provided by the handle assembly 1416, and coupling end portions 1421 is provided on rod 1418. Alternatively, portion 1421 can be provided on handle assembly 1416, while portion 1445 can be provided on rod 1418. The second coupling end portion 1445 comprises a second retaining member 1446. In one embodiment, projecting fingers 1450 are disposed about a periphery of the second retaining member 1446. In one case, two opposed fingers 1450 are provided by member 1446. The periphery of member 1446 may include an inner peripheral surface. In another case, the periphery of member 1446 may include an outer peripheral surface. The corresponding pair of retention slots 1428 of the first coupling end portion 1421 are configured to receive the respective pair of projecting fingers 1450 of the second coupling end portion 1445 upon engagement of the first and second coupling end portions 1421, 1445 via the engagement grooves 1424 and rotation between the first and second coupling end portions 1421, 1445 from a first position to a second position, while compressing spring 1464. According to one construction, the first and second positions are separated by an angle of 90 degrees with respect to one another.

Accordingly, first coupling end portion 1421 (having engagement grooves 1424) is received longitudinally and axially within the second coupling end portion 1445 having a second retaining member 1446. After initially receiving the first coupling end portion 1421 axially into the second coupling end portion 1445, engagement grooves 1424 of the first retaining member 1419 receive the projecting fingers 1450 (or retention pins) longitudinally and axially. Upon sufficiently urging the first coupling end portion 1421 into the second coupling end portion 1445, base plate 1458 contacts end portion 1449 of the connector assembly 1442. Upon further urging the first coupling end portion 1421 into the second coupling end portion 1445, such force compresses coil spring 1464 provided between base plate 1458 and a stop member 1428. Stop member 1428 is provided adjacent the distal end of the first coupling end portion 1421 and coil spring 1464 is seated against stop member 1428.

Thus, coil spring 1464 moves between an uncompressed state to a compressed state, as indicated in FIG. 19, upon urging of the base plate 1458 towards the stop member 1428. Such urging may be accomplished by insertion of the first coupling end portion 1421 of rod 1418 into the second coupling end portion 1445.

Upon sufficiently coupling the first end portion 1421 into the second coupling end portion 1445, projecting fingers 1450 serve as guides that are axially and longitudinally received in engagement grooves 1424. Fingers 1450 further guide into retention slots 1428 via lateral guide surface(s) 1426 upon rotation of the first coupling end portion 1421 from a first position to a second position (e.g., in a counterclockwise direction) as indicated by the arrow in FIG. 19. Accordingly, rod 1418 is securely retained in an in-use position by way of resulting quick connector assembly 1442. Spring 1464 urges fingers 1450 into seated engagement within slots 1428.

In order to remove rod 1418 from handle assembly 1416, a user is required to force rod 1418 axially toward quick connection assembly 1442 to cause compression of spring 1464, after which rod 1418 is rotated from the second position to the first position (e.g., in a counterclockwise direction). In this manner, projecting fingers 1450 that are engaged in locking position retention slots 1428 are urged into unlocking position via lateral guide surface 1426 and into engagement grooves 1424 for easy uncoupling of the first coupling end portion 1421 of rod 1418 from the second coupling end portion 1445.

As shown by the embodiments depicted in FIGS. 7–10, the second coupling end portion 1445 of FIG. 19 may be similarly configured either using a plurality of tubular pieces or a single tubular member.

FIG. 20 is another embodiment of the present invention wherein a rod end 1144 of rod 1118 is provided with male threads 1104 that mate with corresponding female threads 1106 in female receiver 1145 in order to engage rod 1118 with receiver 1145 of a handle assembly of a fishing pole. Furthermore, a lock nut 1102 is provided on threads 1104 to forcibly engage with an end of female receiver 1145 to further secure rod 1118 from rotation relative to receiver 1145.

FIG. 21 is a partially disassembled and exploded side view of a fishing pole according to another embodiment of the present invention, including a connector assembly configured to engage retention pins provided on a rod end 1244 of rod 1218 into a female receiver 1245. Female receiver 1245 includes a tubular insert piece 1247 and a complementary tubular insert piece 1246 configured to be inserted into a cylindrical hollow tube 1206. Retention members (or fingers) 1212 provided on one end of the female receiver 1245 extend radially outwardly to mate in complementary end slots 1213 provided in tube 1206 to restrain motion of the connector assembly 1242 and prevent receiver 1245 from being completely received into the hollow tube 1206 as the connector assembly 1242 is inserted into an end of cylindrical hollow tube 1206 adjacent to the female receiver 1245. Pieces 1247 are glued into tube 1206 with epoxy. Likewise, tube 1206 is glued within a bore in handle assembly 1216. Optionally or additionally, tube 1206 can be pinned or riveted within a tube of handle assembly 1216.

An opposite end portion 1207 is inserted coaxially within a tubular bore of handle assembly 1216. A trim collar 1214 has a nut that is engaged over threads 1205 on the tube of handle assembly 1216. A trim collar 1214 (mostly cosmetic) is provided over connector assembly 1242, after gluing tube 1206 into handle assembly 1216.

FIG. 22 illustrates a rod 1318 having a rod end portion 1344 with a tapered configuration extending from a first end (having retention pins 1350) toward an opposite end of rod 1318. The tapered configuration of rod 1318 may be added to all the embodiments described above where a complementary female shape is added to the female receiver (not shown). Although a single pair of retention pins 1350 is shown in FIG. 22, a plurality of pairs of retention pins may be employed depending on the desired configuration of a connector assembly for a fishing pole.

Accordingly, the previous embodiments depict various fishing poles that present the action of a relatively long pole, such as a six or seven-foot long fishing pole, in the package size of a two to four-foot long fishing pole with the added convenience of easily attaching and removing of the rod to the handle. Furthermore, the connector assembly in the various above-described embodiments enables individual ones of a variety of fishing rods to be removably coupled to the handle, according to user desires. Alternatively, individual ones of a plurality of handles may be removably coupled to a fishing rod, fulfilling the desires of a user wishing to use a specific handle with different rods.

Thus, because of the relative ease of separating the rod from the handle, an ability is imparted to change between different fishing rods for an existing fishing pole. For example, different length fishing rods can be provided with a common fishing pole. Likewise, the ability can be provided to change between embodiments by providing different fishing rods. For example, one fishing rod might have two coil springs, whereas another fishing rod might have a single coil spring. Likewise, the configuration of single and multiple tips can be switched by merely switching between the selected fishing rod that is joined to the fishing handle.

Thus, the ability to easily switch various fishing rods on an existing handle of a fishing pole, or to switch various handles on an existing fishing rod of a fishing pole, enables configuring a relatively short fishing pole so that multiple individuals may fish at a crowded location, such as on a small fishing boat, where the casting room required is significantly reduced by the relatively short fishing pole length.

Furthermore, such easy locking/unlocking of fishing rods to a handle, and vice-versa, using the connector assembly makes transportation and carrying of the configuration easy, especially in the disassembled state, to locations that are relatively hard to access.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A connector assembly for a fishing pole, comprising:
   a first connecting member having a locking stud;
   a second connecting member having an L-shaped slot therein for axial receipt of the stud and rotated locking engagement with the stud; and
   a spring interposed between the first connecting member and the second connecting member which axially urges apart the first connecting member and the second connecting member when provided in rotated locking engagement therebetween;

wherein one of the first connecting member and the second connecting member includes an abutment surface tapering in three dimensions and another of the first connecting member and the second connecting member includes a mating contact surface which mates in engagement with the tapering abutment surface to tighten engagement in three dimensions between the first connecting member and the second connecting member as the first connecting member and the second connecting member are urged apart by the spring corresponding with rotated locking engagement of the stud with the L-shaped slot.

2. The connector assembly of claim 1, wherein the abutment surface tapering in three dimensions comprises a frustoconical surface segment.

3. The connector assembly of claim 1, wherein the mating contact surface is provided by a distal engagement surface of the locking stud.

4. The connector assembly of claim 3, wherein the distal engagement surface comprises a cylindrical surface segment.

5. The connector assembly of claim 1, wherein the mating contact surface is forced into engagement with the tapering abutment surface tapering in three dimensions responsive to compression of the spring to rigidly affix the first connecting member three-dimensionally to the second connecting member when provided in rotated locking engagement.

6. The connector assembly of claim 1, wherein the first connecting member includes two pairs of locking studs, each pair spaced apart from the other along an axis of the first connecting member, the second connecting member includes two pairs of L-shaped slots configured to mate with respective ones of the studs.

7. The connector assembly of claim 1, wherein at least two tapering abutment surfaces tapering in three dimensions are provided on the second connecting member and at least two mating contact surfaces are provided on the first connecting member.

8. A connector assembly, comprising:
a first connecting member having a radially outwardly extending locking stud terminating in a distal engagement surface;
a second connecting member having an L-shaped slot therein configured for axial receipt of the stud and rotated locking engagement with the stud and an engagement surface tapering in three dimensions configured to engage with the distal engagement surface of the locking stud; and
a spring interposed between the first connecting member and the second connecting member which axially urges apart the first connecting member and the second connecting member when provided in rotated locking engagement therebetween to engage the distal engagement surface of the locking stud with the engagement surface tapering in three dimensions while the locking stud is provided in locking engagement within the L-shaped slot.

9. The connector assembly of claim 8, wherein the first connecting member includes a pair of opposed, radially outwardly extending locking studs each terminating in a distal engagement surface and the second connecting member includes a pair of L-shaped slots each configured for axial receipt of a respective one of the studs in rotated locking engagement with the respective stud and a pair of engagement surfaces tapering in three dimensions each configured to engage with the distal engagement surface of the respective locking stud.

10. The connector assembly of claim 8, wherein the engagement surface tapering in three dimensions comprises a frustoconical surface portion.

11. The connector assembly of claim 8, wherein the distal engagement surface of the locking stud comprises a cylindrical surface portion.

12. The connector assembly of claim 8, wherein the first connecting member is provided on a first fishing rod component and the second connecting member is provided on a second fishing rod component.

13. A connector assembly for fishing rod components, comprising:
a first connecting member having a male bayonet connector with a locking stud and a mating contact surface;
a second connecting member having a complementary female bayonet connector with a receiving slot having a pair of leas that are substantially orthogonal to each other and an abutment surface tapering in three dimensions, the female bayonet connector configured to mate in rotatable and locking relation with the male bayonet connector by receiving the locking stud through the receiving slot and into engagement with the abutment surface; and
a spring interposed between the male bayonet connector and the female bayonet connector which drives apart the first connecting member relative to the second connecting member and drives the mating contact surface into rigid three-dimensional engagement with the tapering abutment surface.

14. The connector assembly of claim 13, wherein the locking stud of the male bayonet connector comprises a radially outwardly extending locking stud configured to provide the mating contact surface.

15. The connector assembly of claim 14, wherein the abutment surface of the female bayonet connector includes a frustoconical abutment surface configured to engage the mating contact surface.

16. The connector assembly of claim 15, wherein the male bayonet connector has at least two locking studs and the female bayonet connector has at least two complementary L-shaped slots each configured to receive a respective one of the studs.

* * * * *

UNITED STATES PATENT AND TRADEMARK OFFICE
CERTIFICATE OF CORRECTION

PATENT NO. : 7,168,201 B2
APPLICATION NO. : 11/130298
DATED : January 30, 2007
INVENTOR(S) : Duane C. Markley et al.

It is certified that error appears in the above-identified patent and that said Letters Patent is hereby corrected as shown below:

Title, Page 1, Item [56] U.S. PATENT DOCUMENTS, Col. 2, line 9, please delete second Young reference, Patent No. 999,318.

Title, Page 2, U.S. PATENT DOCUMENTS, Col. 1, line 2, Patent No. 1,351,473 please delete "Forster" and insert --Hardy--.

Title, Page 2, FOREIGN PATENT DOCUMENTS, Col. 2, please delete JP Patent No. "2004-125364" and insert --2004-135364--.

Title, Page 2, FOREIGN PATENT DOCUMENTS, please insert patent number --CH281052-- issue date --06/1952--, country --Switzerland--, class/subclass --43/18.1 CT--.

Col. 11, line 65, please delete "a" before "shell-shaped inserts".

Col. 12, line 23, please delete second "that" before "cooperate to provide".

Col. 18, line 30, please delete "leas" after "a pair of" and insert --legs--.

Signed and Sealed this

Twenty-sixth Day of June, 2007

JON W. DUDAS
*Director of the United States Patent and Trademark Office*